United States Patent
Krishnasamy et al.

(10) Patent No.: US 9,104,632 B2
(45) Date of Patent: *Aug. 11, 2015

(54) ENHANCED FAILOVER MECHANISM IN A NETWORK VIRTUALIZED ENVIRONMENT

(71) Applicant: International Business Machines Corporation, Armonk, NY (US)

(72) Inventors: Sivakumar Krishnasamy, Dharmapuri (IN); Mallesh Lepakshaiah, Bangalore (IN); Vishal R. Mansur, Hubli (IN); Niranjan Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/045,155

(22) Filed: Oct. 3, 2013

(65) Prior Publication Data

US 2014/0281671 A1 Sep. 18, 2014

Related U.S. Application Data (63) Continuation of application No. 13/837,045, filed on Mar. 15, 2013.

(51) Int. Cl.
*G06F 11/00* (2006.01)
*G06F 11/14* (2006.01)
(Continued)

(52) U.S. Cl.
CPC .......... *G06F 11/1484* (2013.01); *G06F 9/4555* (2013.01); *G06F 9/45533* (2013.01); *G06F 9/45558* (2013.01); *G06F 11/142* (2013.01); *G06F 11/2033* (2013.01)

(58) Field of Classification Search
CPC ... G06F 11/14; G06F 11/142; G06F 11/1484; G06F 11/20; G06F 11/2023; G06F 11/2033; G06F 9/455; G06F 9/45533; G06F 9/4555; G06F 9/45558; G06F 9/4856
USPC ........................................................ 714/4.11
See application file for complete search history.

(56) References Cited

U.S. PATENT DOCUMENTS 7,606,141 B2 * 10/2009 Schimke et al. .............. 370/216
8,036,102 B2 10/2011 Jain et al.
(Continued)

OTHER PUBLICATIONS

Abbott, J., Bassemir, R., Hales, C., Plachy, O., & Yeom, M. (2007). 2.1.7 Dual Virtual I/O Servers with SEA failover: Scenario 6. In Advanced Power Virtualization on IBM System p Virtual I/O Server Deployment Examples. IBM Redpapers. REDP-4224-00. http://www.redbooks.ibm.com.*

(Continued)

*Primary Examiner* — Bryce Bonzo
*Assistant Examiner* — Anthony J Amoroso
(74) *Attorney, Agent, or Firm* — Yee & Associates, P.C.; Parashos Kalaitzis (57) ABSTRACT

An embodiment of the invention is associated with a virtualized environment that includes a hypervisor, client LPARs, and virtual servers that each has a SEA, wherein one SEA is selected to be primary SEA for connecting an LPAR and specified physical resources. A first SEA of a virtual server sends a call to the hypervisor, and in response the hypervisor enters physical adapter capability information, contained in the call and pertaining to the first SEA, into a table. Further in response to receiving the call, the hypervisor decides whether or not the first SEA of the virtual server should then be the primary SEA. The hypervisor sends a return call indicating its decision to the first SEA.

15 Claims, 5 Drawing Sheets

(51) Int. Cl.
*G06F 9/455* (2006.01)
*G06F 11/20* (2006.01)

(56) References Cited

U.S. PATENT DOCUMENTS

| | | | |
|---|---|---|---|
| 2006/0250945 A1* | 11/2006 | Fernandes et al. | 370/216 |
| 2008/0140824 A1* | 6/2008 | Jain et al. | 709/224 |
| 2009/0059888 A1* | 3/2009 | Nelson et al. | 370/346 |
| 2009/0150510 A1 | 6/2009 | Kovacs et al. | |
| 2009/0307377 A1 | 12/2009 | Anderson et al. | |
| 2012/0180070 A1 | 7/2012 | Pafumi et al. | |
| 2012/0254863 A1* | 10/2012 | Baratakke et al. | 718/1 |
| 2013/0047024 A1* | 2/2013 | Chokshi et al. | 714/4.11 |
| 2013/0194912 A1* | 8/2013 | Baratakke et al. | 370/220 |

OTHER PUBLICATIONS

Krishnasamy et al., "Enhanced Failover Mechanism in a Network Virtualized Environment," U.S. Appl. No. 13/837,045, filed Mar. 15, 2013, 33 pages.

Office Action, dated Dec. 18, 2014, regarding U.S. Appl. No. 13/837,045, 14 pages.

\* cited by examiner

ENHANCED FAILOVER MECHANISM IN A NETWORK VIRTUALIZED ENVIRONMENT

This application is a continuation of application Ser. No. 13/837,045, filed Mar. 15, 2013.

BACKGROUND

1. Field

The invention disclosed and claimed herein generally pertains to a network virtualized environment, wherein a Virtual Input/Output Server (VIO Server or VIOS) has a shared ethernet adapter (SEA) for connecting client Logical Partitions (LPARs) to physical network resources. More particularly, the invention pertains to an environment of the above type having two VIO Servers, in order to provide a primary SEA and a backup SEA. Even more particularly, the invention pertains to an improved or enhanced failover mechanism, to selectively exchange the primary and backup roles or states of the two SEAs, as required.

2. Description of the Related Art

As is known by those of skill in the art, VIOS is a special purpose virtual machine that can virtualize I/O resources to other virtual machines, such as client LPARs, in a network virtualized environment comprising a central electronics complex (CEC) or other computer system environment. VIOS works by owning physical resources, e.g. storage and network resources, and mapping respective physical resources to virtual resources. Client LPARs connect to physical resources via these mappings.

In a useful arrangement or configuration, a client LPAR is connected to an internal virtual ethernet, and the SEA of a VIOS, comprising a module on the VIOS, is used to establish a bridge between the internal virtual ethernet, and an external physical ethernet network. The client LPAR thus has access to network IO resources, delivered via the VIOS. However, this arrangement could be quite undesirable, if the VIOS represented a potential single point of failure for that client LPAR. To avoid this single point of failure, the VIOS have typically been configured in pairs, along with a failover method, so that if one VIOS goes down, the other VIOS takes over. Thus, the client partition is not impacted.

In a common prior art failover arrangement, two VIO Servers are provided, wherein each one has a SEA. The SEA of one of the VIO Servers is initially selected to be the primary SEA, which is responsible for establishing a bridge as described above, to connect client LPARs to physical resources. The SEA of the other VIO Server becomes the backup SEA, and remains passive while in that role. Each of the SEAs is configured with a trunk virtual ethernet adapter and a corresponding trunk priority, and the SEA with the higher trunk priority becomes the primary SEA.

The information about liveliness of each SEA, and changes in its trunk priority, is exchanged between the two SEAs by extending a control channel between them. The control channel is a virtual ethernet on a separate virtual local area network (VLAN) for exchanging keep alive (KA) messages and other state information between the primary and backup SEAs. More particularly, the primary SEA sends KA packets to the backup SEA at prespecified intervals, such as every 300 msecs, wherein the KA packets contain the priority of the primary SEA.

Upon reception of each KA, the backup SEA checks whether the priority of the primary SEA is higher than its own priority, and if so it just keeps listening to KAs. However, if the backup SEA trunk priority is found to be higher, then the backup SEA kicks off a state change, and sends a RECOVERY packet to the primary SEA to indicate the priority of the backup SEA. Upon receiving the RECOVERY packet, the primary SEA will validate that the backup SEA priority is indeed higher. The primary SEA accepts the RECOVERY packet by sending a NOTIFY packet to the backup SEA. Once the NOTIFY packet is received, the backup SEA takes over as primary SEA, and starts sending KAs to the previous primary SEA, which goes to backup state and starts listening to KAs.

In the above arrangement, if the primary SEA goes down, the backup SEA waits for the time period of a specified number of successive KAs, such as 3KAs or 900 msec. If no KA is received by the backup SEA during this period, the backup SEA then takes over as primary SEA, and becomes responsible for subsequent bridging tasks.

The above prior art arrangement has some significant drawbacks. For example, this design has complete dependence on the control channel. Any issues that occur with the control channel will cause SEA failover to behave in an unpredictable manner, and may likely result in network outages. There are instances where the primary SEA is functioning fine, but due to problems on the control channel (such as packet drops or communication failures), the backup SEA has not received KAs. The backup SEA therefore assumes the primary SEA is dead, and takes over as primary SEA. This results in both of the SEAs bridging simultaneously, which can result in network loops unless switches have implemented Spanning Tree Protocol (STP). These network loops can bring an entire network to a standstill.

Further drawbacks include the complexity of failover configuration using control channels, which are faced by many customers and other users. Also, the requirement of using a VLAN as a control channel prevents LPARs from using this VLAN for any communication.

The above prior art arrangement, and additional drawbacks and disadvantages thereof, is described hereinafter in further detail, in connection with FIG. 2.

SUMMARY

Embodiments of the invention propose an alternate method or approach of communicating liveliness and priority changes on a SEA, in regard to its involvement in failover, without any use of or need for control channels. Embodiments achieve this result by having each SEA talk directly to the associated hypervisor. The hypervisor can then maintain state information for both the SEAs, and accordingly make the corresponding trunk active, and indicate back to both SEAs in regard to which SEA is acting as primary, and which is acting as backup. With this solution, the hypervisor becomes the single authority that decides the primary bridging responsibility. Also, with the new design, each SEA of the dual VIOS can publish their capabilities along with their truck priorities to the hypervisor. The hypervisor can then consider these capabilities, in addition to the trunk priorities, when making the decision of which SEA to select to handle the bridging.

An embodiment of the invention directed to a computer implemented method is associated with a network virtualized environment that includes a hypervisor, one or more client logical partitions (LPARs), and one or more virtual servers that each has a shared ethernet adapter (SEA), wherein one of the SEAs is selected to be the primary SEA for use in configuring connections between an LPAR and specified physical resources. The method includes the step of operating a first SEA, comprising the SEA of a first one of the virtual servers, to send one or more calls to the hypervisor. The method further includes, in response to receiving one of the calls at the hypervisor, operating the hypervisor to enter selected information contained in the received call, which pertains to the first SEA, into an information table. Further in response to receiving the call at the hypervisor, the hypervisor is operated to decide whether or not the first SEA of the selected virtual server should then be the primary SEA. The method further includes sending a specified return call from the hypervisor to the first SEA which indicates the decision of the hypervisor.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
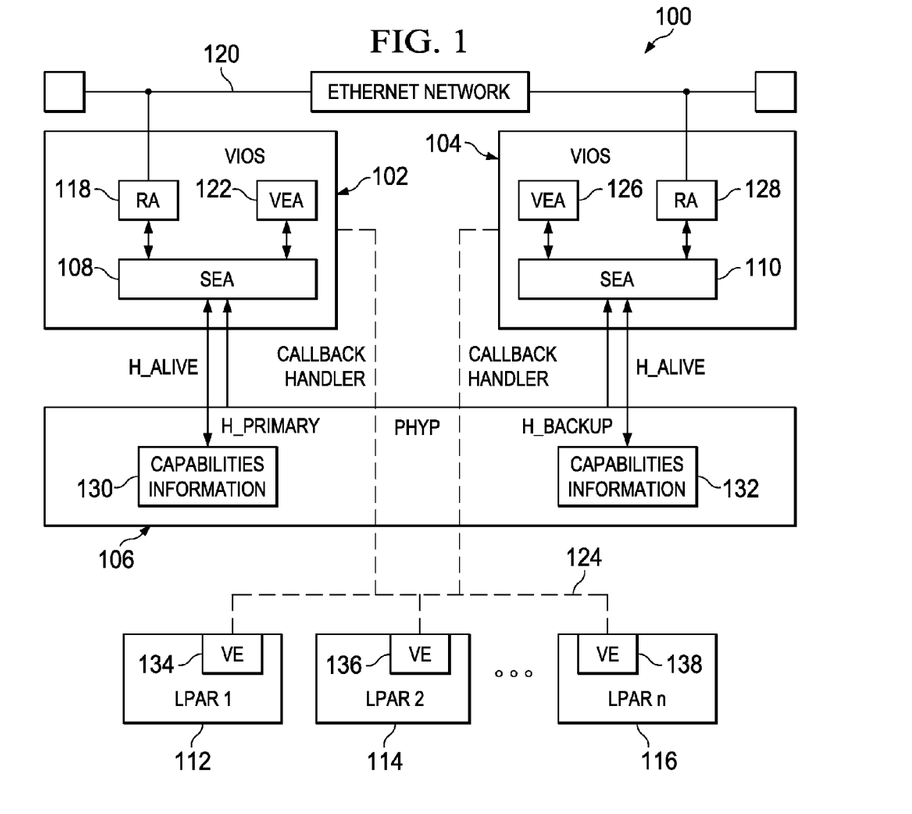
FIG. 1 is a block diagram showing components of an embodiment of the invention.

Referring to FIG. 1, there is shown a configuration of components 100, which is provided to achieve network virtualization in a CEC or other computer-related system. A CEC or central electronics complex is a term used to describe a module in a modular server system, such as the IBM Power™ 570, wherein the module is a building block that houses elements such as CPUs, a RAM and PCI backplane. The components include VIOS or VIO Servers 102 and 104, as described above, and a power hypervisor (PHYP) 106. VIO Servers 102 and 104 and hypervisor 106 respectively interact as described hereinafter in further detail, to implement an embodiment of the invention. VIOS 102 is provided with SEA 108, and VIOS 104 is provided with a SEA 110.

Configuration 100 includes the client LPARs 1-n, also referenced as LPARs 112-116, respectively. Some means must be provided to enable each LPAR to be connected to network resources. In order to make these connections as required, one of the SEAs, for example SEA 108, is selected to be primary SEA. The primary SEA is responsible for providing a bridge, to allow client LPARs to access physical resources, and to send and receive outside network traffic.

More particularly, FIG. 1 shows that VIOS 102 includes a real or physical ethernet adapter (RA) 118, which is associated with SEA 108. RA 118 is directly connected to an external physical ethernet network 120, that accesses physical I/O resources of the type referred to above. In addition, VIOS 102 includes a virtual ethernet adapter (VEA) 122. VEA 122, acting in association with hypervisor 106, is linked to an internal virtual ethernet 124 which can be accessed by each of the LPARs. LPARs 112-116 access internal ethernet 124 by means of virtual ethernet (VE) adapters 134-138, respectively.

By providing the components and their arrangement as described above, SEA 108 hosted in VIOS 102 can readily be used to establish a bridge between RA 118 and VEA 122. Respective LPARs may thereby be connected to physical resources through external ethernet 120. It is to be appreciated that trunk adapters associated with respective LPARs, or other components required to carry out the above bridging task in accordance with conventional practice, are configured with or included as part of SEA 102 or VEA 122. Each such trunk adapter would have a corresponding trunk priority.

Referring further to FIG. 1, there is shown VIOS 104 provided with a VEA 126 and RA 128, in addition to SEA 110. It is to be appreciated that VIO Servers 102 and 104 are equivalent to one another, to the extent needed for either of them to be able to provide a bridge between respective LPARs 112-116 and real ethernet network 120. Accordingly, SEA 110, VEA 126, RA 128, and their arrangements with respect to VIOS 104, are respectively identical or equivalent to SEA 108, VEA 122 and RA 118, and their arrangements with respect to VIOS 102.

In order to implement a failover method in accordance with an embodiment of the invention, SEA 108 of VIOS 102 and SEA 110 of VIOS 104 are each provided with the capability to issue an hcall, that is, a call to the hypervisor 106, at predetermined intervals such as 300 msecs. This call is referred to herein as an H_ALIVE call. During set up of the two VIO Servers 102 and 104, hypervisor 106 will initially receive an H_ALIVE call from one of the two SEAs, for example, SEA 108. In response, hypervisor 106 sends a return code or call H_PRIMARY to SEA 108, to indicate that SEA 108 is to be the primary SEA for configuration 100. Hypervisor 106 takes this action, since it is not yet aware of any other SEA component for the configuration 100. SEA 108 thus becomes responsible for the bridging tasks as described above, to connect respective LPARs to ethernet 120. SEA 108 also proceeds to issue successive H_ALIVE calls at the predetermined interval.

As a very useful feature of embodiments of the invention, the H_ALIVE calls from SEA 108 include information indicating significant physical capabilities of physical adapters that are owned by SEA 108. This could include, without limitation, the bandwidth of a network interface controller (NIC) belonging to the SEA, media speed, and offload capabilities, e.g. large send, large receive, checksum offload, or jumbo frames. In addition, the H_ALIVE calls contain the trunk priority of any trunk adapter associated with the SEA 108, as referred to above. Upon receiving an H_ALIVE call, the hypervisor 106 causes all such information included in the call to be read and entered into a table 130, which remains accessible to the hypervisor 106.

Subsequent to the initial H_ALIVE call from SEA 108, hypervisor 106 will receive an H_ALIVE call from the SEA 110. This call will include information indicating significant physical capabilities of physical adapters owned by the SEA 110, in like manner with the information provided by H_ALIVE calls from SEA 108. The H_ALIVE calls from SEA 110 will also contain the trunk priority of any trunk adapter associated with the SEA 110. The hypervisor will enter all information included in this call into a table 132.

In response to the H_ALIVE call from SEA 110, hypervisor 106 will first send a return code or call H_BACKUP to SEA 110. This informs SEA 110 that there already is a primary SEA, so that SEA 110 must be the backup SEA. Accordingly, SEA 110 registers a callback handler with hypervisor 106, which can comprise code used to enable the hypervisor to call SEA 110.

The hypervisor then reads the capabilities of SEA 110 and its trunk priority, as shown by the information included in its H_ALIVE call. Hypervisor 106 compares this information with the most recent information pertaining to SEA 108, as shown by entries in the hypervisor tables 130 and 132, and uses the comparison to decide whether SEA 108 or SEA 110 should be the primary SEA. In one example, the user could preconfigure hypervisor 106 to select the SEA that had the higher bandwidth (or other specified physical capability) to be the primary SEA, even though that SEA had a lower trunk priority than the other SEA. In another example, the SEA having a higher value for a prespecified physical capability would be selected by the hypervisor to be primary SEA, in the event that both SEAs had the same trunk priority.

When hypervisor 106 has made the above decision regarding SEAs 108 and 110, and then receives an H_ALIVE call from primary SEA 108, hypervisor 106 will send either a return code H_PRIMARY or H_BACKUP back to SEA 108. Return code H_PRIMARY will be sent if hypervisor 106 has decided to retain SEA 108 in the state or role of primary SEA. In response to this code, SEA 108 will continue to issue H_ALIVE calls to hypervisor 106 at the prespecified intervals, and SEA 110 will continue in backup status.

If the hypervisor 106 decides that SEA 110 should become the primary SEA, return code H_BACKUP is sent to primary SEA 108, to indicate that SEA 108 must become the backup SEA. Simultaneously, hypervisor 106 uses the callback handler registered by SEA 110 to inform SEA 110 that it now will become primary SEA. Accordingly, SEA 110 starts issuing H_ALIVE calls at the prespecified intervals, and the code H_PRIMARY is returned to each such call. SEA 108 stops issuing H_ALIVE calls and moves to backup status. Also, SEA 108 now registers callback handler with hypervisor 106, so that SEA 108 can later be called back to being primary SEA, if this becomes necessary.

The above procedure generally describes setting up or configuring the VIO Servers 102 and 104 and their respective SEAs, to provide a failover mechanism or approach in accordance with an embodiment of the invention. The operation and interaction of the VIO Servers and their SEAs, in response to events that can trigger failover, is described hereinafter in further detail.

Figure 2:
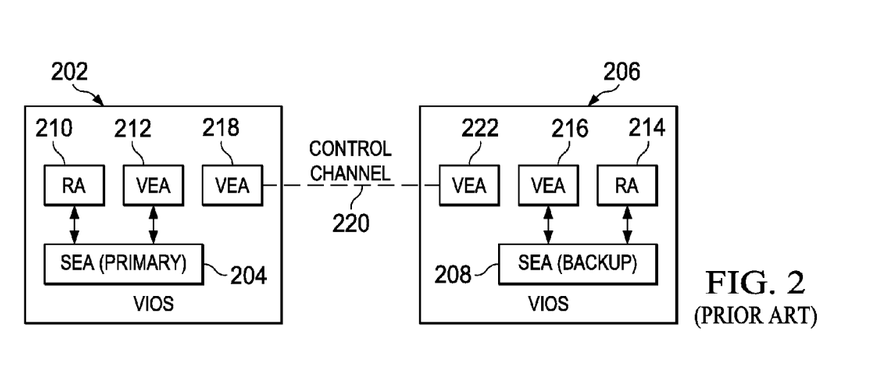
FIG. 2 is a block diagram showing a configuration of the prior art.

Referring to FIG. 2, there is shown a prior art failover arrangement of the type described above. FIG. 2 shows a VIOS 202 having a SEA 204, and a VIOS 206 having a SEA 208, wherein SEA 204 is the primary SEA and SEA 208 is the backup SEA. SEA 204 is associated with an RA 210 and a VEA 212, which are respectively connected to an external physical ethernet, and to a virtual internal ethernet and one or more LPARs (not shown). Similarly, SEA 208 is associated with an RA 214, and a VEA 216, which are respectively connected to an external physical ethernet, and to a virtual internal ethernet and one or more LPARs (not shown).

As a further essential component of the arrangement of FIG. 2, a control channel 220 is provided between SEA 204 and SEA 208. Control channel 220 is more particularly shown extending between a VEA 218 associated with SEA 204, and VEA 222 associated with SEA 208. The control channel 220 thus comprises a virtual ethernet that is on a separate VLAN, and is separate from the virtual ethernet for the LPARs. Control channel 220 is needed to route KA packets as described above from primary SEA 204 to backup SEA 208, at specified intervals, and to return RECOVERY packets from SEA 208 to SEA 204. Control channel 220 is needed further to return NOTIFY packets from SEA 204 to SEA 208.

As stated above, there are significant disadvantages in the prior art failover arrangement of FIG. 2. These include a complete dependence on the control channel, which can result in unpredictable behavior of the SEAs, and the complexity of the failover configuration. Also, the VLAN dedicated for the control channel is unavailable for any other use, such as communication by the LPARs. Further disadvantages include the need for KA packet transfers at every specified interval, and a need for KA packet transmit and receive buffers to be registered with the hypervisor. Moreover, no single authority controls the primary bridging responsibility of a SEA, since each SEA makes such decisions on its own. Also, the bridging decision is purely based on priority and does not consider physical adapter capabilities, such as bandwidth, media speed or offload capabilities, even though these capabilities can play a major role in network performance.

In contrast, embodiments of the invention as described herein overcome drawbacks of the above type, and provide a number of advantages and benefits. These advantages may include, without limitation, the following:

- The state of the SEA (primary or backup) is not maintained by individual SEAs, and thus avoids inconsistent behavior that could lead to loops in the network
- Complexity of the SEA configuration is reduced such that a user needs to only configure a trunk adapter with a priority, without worrying about a prior art failover configuration that can create issues such as loops in the network.
- A control channel which becomes a single point of failure is totally avoided in embodiments of the inventions, thus avoiding control channel failures that could lead to both SEAs becoming primary simultaneously, which again might create issues such as loops in the network.
- Avoiding control channel creation and usage reduces packet exchanges between the two SEAs, and thus reduces resource and CPU cycle requirements on the VIO Servers of the two SEAs.
- Bridging decisions can be based on physical adapter capabilities such as bandwidth, media speed or offload capabilities, in addition to trunk priorities.

Figure 3A:
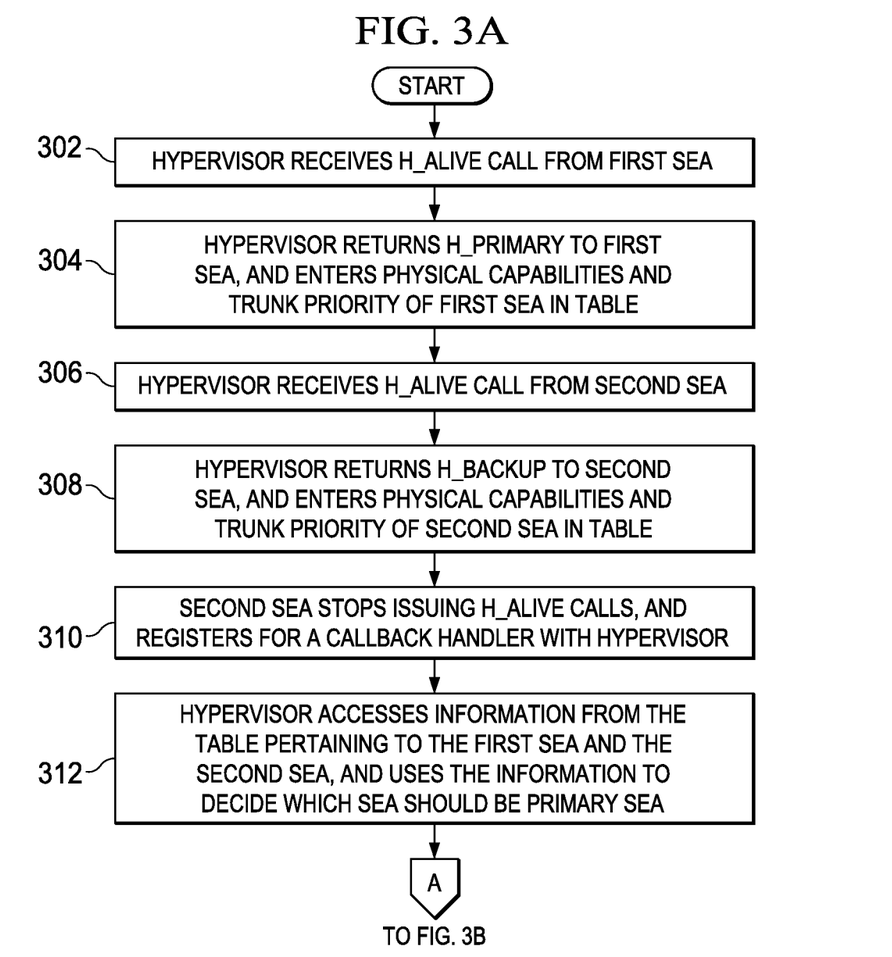
FIGS. 3A and 3B depict a flowchart showing steps of a method comprising an embodiment of the invention
Figure 3B:
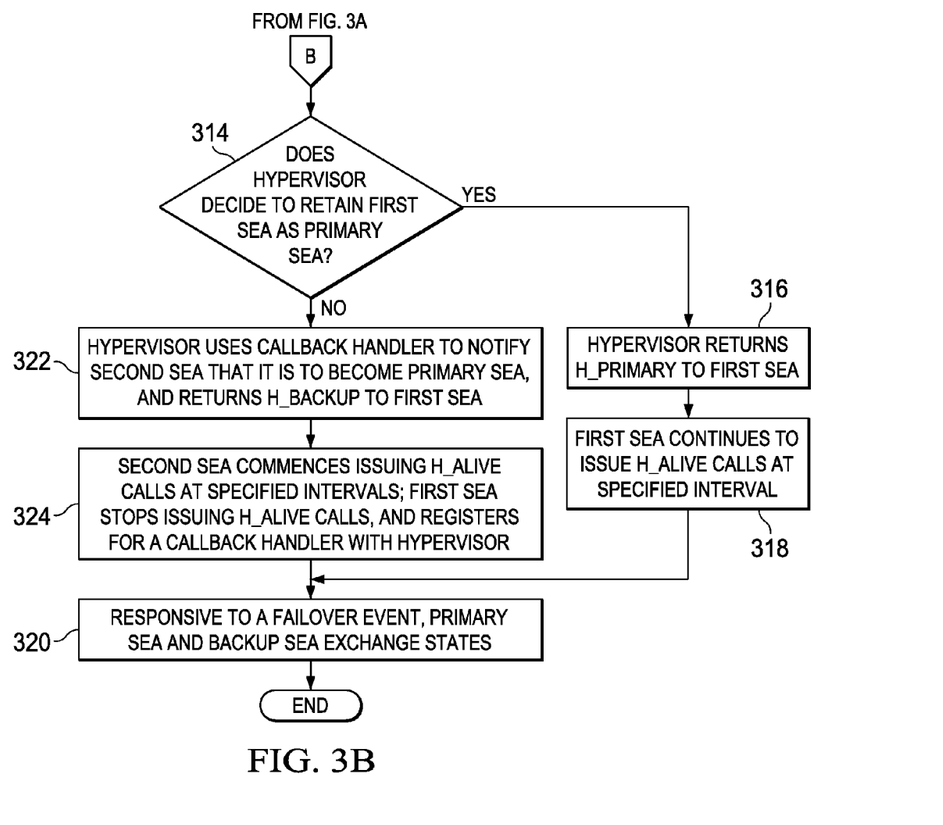

Referring to FIGS. 3A and 3B together, there are shown steps of a method for setting up and operating a failover mechanism, in accordance with an embodiment of the invention. Prior to commencing the method, a first VIO Server having a first SEA, and a second VIO Server having a second SEA, are configured in a specified relationship with one another and a power hypervisor. The specified relationship could, for example, be the relationship described above in connection with FIG. 1, between VIOS 102 and SEA 108, VIOS 104 and SEA 110, and hypervisor 106. Also, the first and second SEAs are associated with the same physical volume identifier (PVID).

Initially, the first SEA and the second SEA both issue H_ALIVE calls at a specified interval, such as 300 msec. The hypervisor of the failover mechanism receives an H_ALIVE call from the first SEA, before receiving an H_ALIVE call from the second SEA. This occurs at step 302, and commences the method of FIGS. 3A and 3B.

Responsive to the received H_ALIVE call, the hypervisor sends the return code H_PRIMARY to the first SEA at step 304. The hypervisor takes this action, because it is then unaware of any SEA other than the first SEA. Also at step 304, the hypervisor server reads information in the H_ALIVE call that pertains to physical adapter capabilities of the first SEA and to a trunk priority, and enters such information into a table.

At step 306, the hypervisor receives an H_ALIVE call from the second SEA. In response, the hypervisor at step 308 sends the return code H_BACKUP to the second SEA. The hypervisor does this because it previously acknowledged another SEA as primary SEA. However, the hypervisor enters the physical adapter capabilities and the trunk priority of the second SEA into the table, in like manner with the first SEA.

Responsive to the H_BACKUP call at step 310, the second SEA stops issuing H_ALIVE calls, and registers for a callback handler with the hypervisor.

At step 312, in response to another H_ALIVE call from the first SEA, the hypervisor accesses information from the table pertaining to the first SEA and to the second SEA, and uses the information to decide which SEA should be primary SEA. For example, as described above, the hypervisor could select the SEA that had the higher bandwidth (or other specified physical capability) to be the primary SEA, even though that SEA had a lower trunk priority then the other SEA. The decision step 314 indicates whether or not the hypervisor has decided to retain the first SEA as primary SEA.

If the hypervisor decides to keep the first SEA as the primary SEA, the hypervisor communicates this decision at step 316, by sending the return code H_PRIMARY to the first SEA. The first SEA thereafter issues H_ALIVE calls at the specified intervals, as shown by step 318. This continues until a failover event occurs at step 320, whereupon the primary first SEA and the backup second SEA exchange roles or states. Examples of these failover events are described hereinafter in further detail.

If the hypervisor decides at step 314 to not keep the first SEA as the primary SEA, the hypervisor at step 322 uses the callback handler for the second SEA to notify the second SEA that it is to become the primary SEA. The hypervisor also sends the return code H_BACKUP to the first SEA, move the first SEA to backup status.

At step 324, in response to the notification of step 322, the second SEA commences issuing H_ALIVE calls at the specified interval. Also, the first SEA stops issuing H_ALIVE calls, and registers for a callback handler with the hypervisor. This continues until a failover event occurs at step 320, whereupon the primary second SEA and the backup first SEA exchange roles or states. The method of FIGS. 3A and 3B then ends.

One failover event of step 320 occurs when the primary SEA network goes down. When this happens, the primary SEA changes its state to LIMBO, and issues an H_ALIVE call to the hypervisor with that state. Upon seeing the call with the LIMBO state, the hypervisor sends the return code H_BACKUP, so that the primary SEA moves to backup status, and operates as described above. Also, the hypervisor issues the callback handler registered by the backup SEA, to indicate that it is to become primary SEA, and start issuing H_ALIVE calls.

Another failover event can occur when the trunk priority of the primary SEA is modified, in a situation wherein the hypervisor uses the trunk priorities of respective SEAs to select one of them to be primary SEA. In this event, the primary SEA issues an H_ALIVE call with its new trunk priority. If the hypervisor determines that the new trunk priority is less than the trunk priority of the backup SEA, the hypervisor will return H_BACKUP to the primary SEA, and issue callback handler on the backup SEA to then make it the primary SEA.

A further failover event occurs when the VIOS that has the primary SEA goes down, so that no further H_ALIVE calls are issued. After a timeout or time period during which no hcalls are issued, the hypervisor triggers a notice that this has occurred. The hypervisor then immediately calls the callback handler on the backup SEA, to make it the primary SEA. Also, there are mechanisms with which the hypervisor can detect that a partition has gone down.

After a recovery happens on the SEA that previously had been primary SEA, and then became backup SEA for some reason such as one of the failover events described above, the recovered SEA issues an H_ALIVE call to the hypervisor. This call indicates the SEA recovery to the hypervisor. The hypervisor then makes a decision, using the procedure as described above, to decide which SEA should then be the primary SEA. Thereafter, the hypervisor implements the decision.

By using the hypervisor in connection with the primary SEA as described above, embodiments of the invention provide a very useful optimization feature. More particularly, if there is only a single SEA on the CEC or other system, the hypervisor will know this, since the hypervisor has visibility on all trunk adapters on the system and their PVID. Accordingly, the single SEA will be the primary SEA and issue H_ALIVE calls. In response to one of these calls, the hypervisor will send the return code H_STANDALONE. This code will inform the primary SEA that it can stop issuing H_ALIVE calls. If an additional SEA is created later, the hypervisor can indicate that the first SEA is to be the primary SEA, by using a callback handler previously registered by the first SEA. The first SEA can then start issuing H_ALIVE calls.

Figure 4:
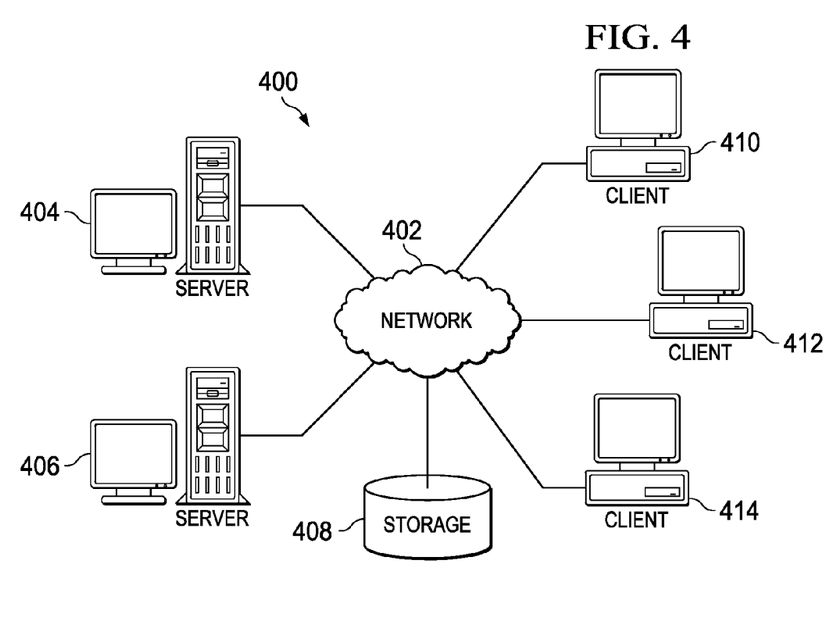
FIG. 4 is a block diagram showing a network of data processing systems in which an embodiment of the invention may be implemented.

FIG. 4 is a pictorial representation of a network of data processing systems in which illustrative embodiments of the invention may be implemented. Network data processing system 400 is a network of computers in which the illustrative embodiments may be implemented. Network data processing system 400 contains network 402, which is the medium used to provide communications links between various devices and computers connected together within network data processing system 400. Network 402 may include connections, such as wire, wireless communication links, or fiber optic cables.

In the depicted example, server computer 404 and server computer 406 connect to network 402 along with storage unit 408. In addition, client computers 410, 412, and 414 connect to network 402. Client computers 410, 412, and 414 may be, for example, personal computers or network computers. In the depicted example, server computer 404 provides information, such as boot files, operating system images, and applications to client computers 410, 412, and 414. Client computers 410, 412, and 414 are clients to server computer 404 in this example. Network data processing system 400 may include additional server computers, client computers, and other devices not shown.

Program code located in network data processing system 400 may be stored on a computer-recordable storage medium and downloaded to a data processing system or other device for use. For example, program code may be stored on a computer-recordable storage medium on server computer 404 and downloaded to client computer 410 over network 402 for use on client computer 410.

In the depicted example, network data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 400 also may be implemented as a number of different types of networks, such as, for example, an intranet, a local area network (LAN), or a wide area network (WAN). FIG. 4 is intended as an example, and not as an architectural limitation for the different illustrative embodiments.

Figure 5:
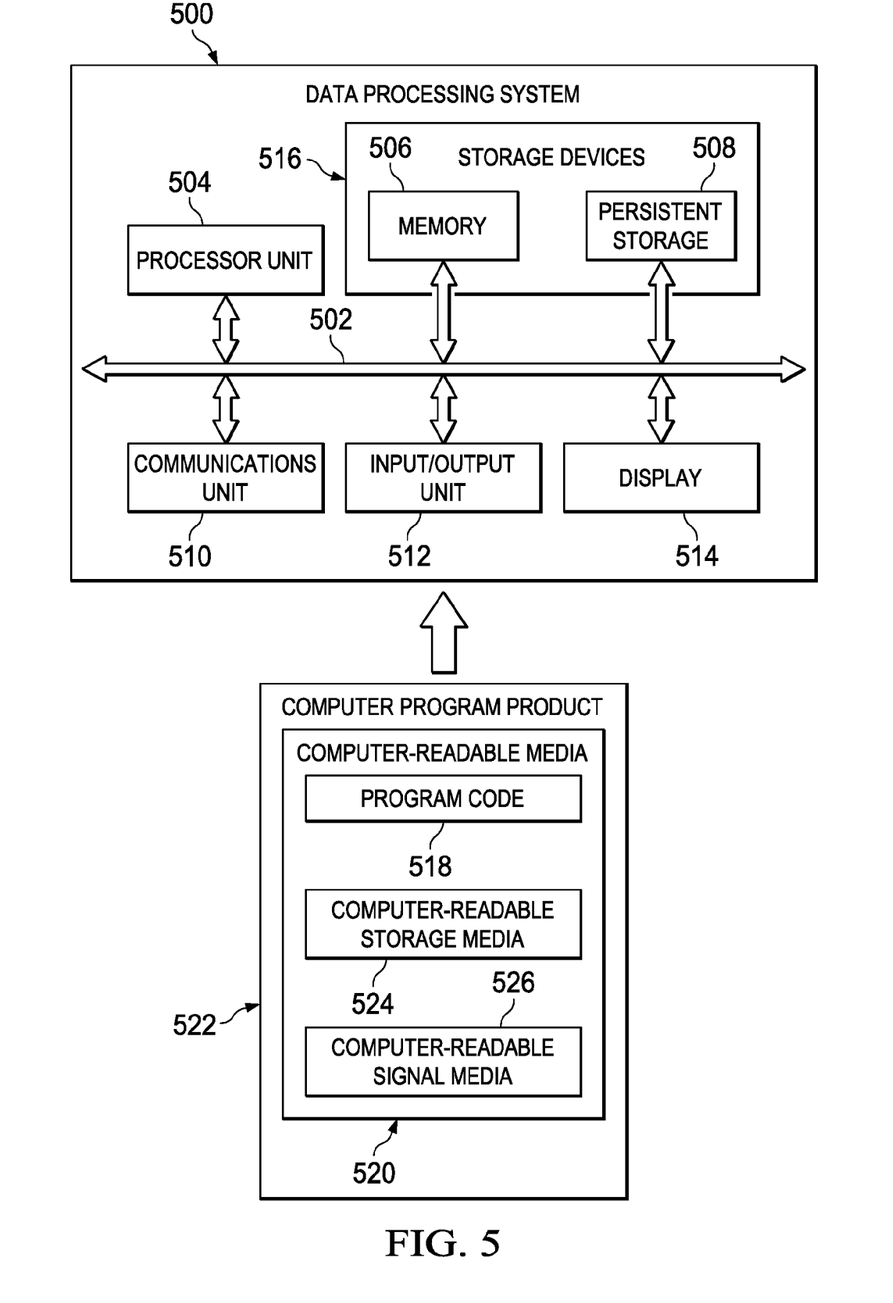
FIG. 5 is a block diagram showing a computer or data processing system that may be used in implementing embodiments of the invention.

Turning now to FIG. 5, an illustration of a data processing system is depicted in accordance with an illustrative embodiment. In this illustrative example, data processing system 500 includes communications fabric 502, which provides communications between processor unit 504, memory 506, persistent storage 508, communications unit 510, input/output (I/O) unit 512, and display 514.

Processor unit 504 serves to process instructions for software that may be loaded into memory 506. Processor unit 504 may be a number of processors, a multi-processor core, or some other type of processor, depending on the particular implementation. "A number," as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for processing by processor unit 504. The processes of the different embodiments may be performed by processor unit 504 using computer-implemented instructions, which may be located in a memory, such as memory 506.

These instructions are referred to as program code, computer usable program code, or computer readable program code that may be read and processed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for processing by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500.

In some instances, computer readable storage media 524 may not be removable from data processing system 500. In these examples, computer readable storage media 524 is a physical or tangible storage device used to store program code 518 rather than a medium that propagates or transmits program code 518. Computer readable storage media 524 is also referred to as a computer readable tangible storage device or a computer readable physical storage device. In other words, computer readable storage media 524 is media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, a remote data processing system, or some other device capable of storing and transmitting program code 518. For example, program code stored in the computer readable storage medium in data processing system 500 may be downloaded over a network from the remote data processing system to the computer readable storage medium in data processing system 500. Additionally, program code stored in the computer readable storage medium in the server computer may be downloaded over the network from the server computer to a computer readable storage medium in the remote data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In a network virtualized environment that includes a hypervisor, one or more client logical partitions (LPARs), and one or more virtual servers that each has a shared ethernet adapter (SEA), wherein one of the SEAs is selected to be the primary SEA for use in configuring connections between one or more LPARs and specified physical resources, a computer implemented method comprising the steps of:

operating a first SEA, comprising the SEA of a first one of the virtual servers, to send one or more calls to the hypervisor;

in response to receiving one of the calls at the hypervisor, operating the hypervisor to enter selected information, which is contained in the received call and pertains to the first SEA, into an information table;

further in response to receiving the call at the hypervisor, operating the hypervisor to decide whether or not the first SEA of the selected virtual server should then be the primary SEA; and sending a specified return call from the hypervisor to the first SEA indicating the decision of the hypervisor.

2. The method of claim 1, wherein:

responsive to a return call indicating that the hypervisor has decided that the first SEA should be the primary SEA, the first SEA continues to issue alive calls at specified intervals, wherein each alive call informs the hypervisor that the first SEA is then available to configure a connection between the one or more LPARs and specified physical resources.

3. The method of claim 2, wherein:

the first SEA configures the connection by establishing a bridge between the one or more LPARs and specified physical resources.

4. The method of claim 2, wherein:

in response to the hypervisor determining that the first SEA is the only SEA then available to be primary SEA, and further in response to an alive call issued by the first SEA, the hypervisor is operated to send a return call to the first SEA, which causes the first SEA to stop issuing alive calls.

5. The method claim 1, wherein:

responsive to a return call indicating that the hypervisor has decided that the first SEA should be a backup SEA for a different SEA selected to be primary SEA, the first SEA registers for a callback handler with the hypervisor.

6. The method of claim 5, wherein:

subsequent to registering for the callback handler, the hypervisor issues a call to the first SEA using the callback handler, to inform the first SEA that it is then to become the primary SEA.

7. The method of claim 1, wherein the first SEA, and a second SEA of a second one of the virtual servers, each sends at least one alive call to the hypervisor, wherein each alive call from a SEA informs the hypervisor that that SEA is then available to configure a connection between the one or more LPARs and specified physical resources, and further informs the hypervisor of specified physical adapter capabilities of that SEA.

8. The method of claim 7, wherein:

to decide whether the first SEA or the second SEA should be the primary SEA, the hypervisor compares the value of a physical adapter capability of the first SEA with the value of the same physical adapter capability of the second SEA.

9. The method of claim 7, wherein:

an alive call of both the first and second SEAs informs the hypervisor of the trunk priority of the SEA to which the alive call belongs, and the hypervisor selects one of the SEAs to be primary SEA, wherein the selected SEA has a lower trunk priority than the other SEA.

10. The method of claim 7, wherein:

the physical adapter capabilities includes one or more capabilities from a group that includes bandwidth, one or more offload capabilities, and media speed.

11. The method of claim 7, wherein:

the hypervisor sends a primary return call to the first SEA to place the first SEA in the primary state, whereupon the first SEA continues to issue alive calls to the hypervisor at specified intervals.

12. The method of claim 7, wherein:

the hypervisor sends a backup return call to the second SEA to place the second SEA in a backup state, whereupon the second SEA halts issuing alive calls and registers for a callback handler with the hypervisor.

13. The method of claim 1, wherein, the first SEA is initially selected to be primary SEA, a second SEA of a second one of the virtual servers is initially selected to be backup SEA, and the hypervisor causes the two SEAs to exchange states with each other when a failover event occurs.

14. The method of claim 13, wherein the failover event comprises an event selected from a group of events that include at least the virtual server of the primary SEA goes down, the network of the primary SEA goes down, and the trunk priority of the primary SEA is modified.

15. The method of claim 1, wherein:

the virtual server comprises a Virtual Input Output Server (VIOS).

* * * * *